(12) United States Patent
Kim (10) Patent No.: US 8,155,284 B2
(45) Date of Patent: Apr. 10, 2012

(54) FACSIMILE APPARATUS TO SUPPORT A PLURALITY OF LINES AND OPERATING METHOD THEREOF

(75) Inventor: Eog-kyu Kim, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1344 days.

(21) Appl. No.: 11/733,932

(22) Filed: Apr. 11, 2007

(65) Prior Publication Data
US 2008/0095340 A1    Apr. 24, 2008

(30) Foreign Application Priority Data
Oct. 18, 2006    (KR) .................. 10-2006-0101386

(51) Int. Cl.
*H04M 11/00* (2006.01)
(52) U.S. Cl. ........................... 379/93.09; 358/425
(58) Field of Classification Search .......... 379/93.01, 379/93.09, 93.05–93.11, 100.01, 100.15–100.17; 358/425, 434–436, 438–440, 442, 468
See application file for complete search history.

(56) References Cited

U.S. PATENT DOCUMENTS

| | | | | |
|---|---|---|---|---|
| 5,170,266 | A * | 12/1992 | Marsh et al. | 379/100.12 |
| 5,463,616 | A * | 10/1995 | Kruse et al. | 370/276 |
| 5,513,212 | A * | 4/1996 | Bremer | 375/222 |
| 5,661,568 | A * | 8/1997 | Ueno | 358/435 |
| 5,696,812 | A | 12/1997 | Ono | |
| 5,835,239 | A * | 11/1998 | Kim | 379/100.01 |
| 5,854,830 | A * | 12/1998 | Kenmochi | 379/100.15 |
| 7,605,934 | B2 * | 10/2009 | Rollins | 358/1.15 |
| 2002/0168056 | A1 * | 11/2002 | Binal | 379/93.09 |
| 2007/0035779 | A1 * | 2/2007 | Rollins | 358/402 |

FOREIGN PATENT DOCUMENTS

| | | |
|---|---|---|
| GB | 2320645 | 6/1998 |
| JP | 59066260 | 4/1984 |
| JP | 01268239 | 10/1989 |
| JP | 02215261 | 8/1990 |
| JP | 03154560 | 7/1991 |
| JP | 5-83507 | 4/1993 |
| JP | 7-212492 | 8/1995 |
| JP | 10164262 | 6/1998 |
| JP | 10215359 | 8/1998 |
| JP | 11-252273 | 9/1999 |
| JP | 2001188642 | 7/2000 |
| JP | 2006-100976 | 4/2006 |
| WO | WO 99/38294 | 7/1999 |

OTHER PUBLICATIONS

European Search Report dated Apr. 29, 2008 issued in EP 07113354.
Partial European Search Report dated Nov. 14, 2007 issued in EP 07113354.0.
KR Office Action issued Nov. 16, 2011 in KR Patent Application No. 10-2007-0066238.

* cited by examiner

*Primary Examiner* — Curtis Kuntz
*Assistant Examiner* — Maria El-Zoobi
(74) *Attorney, Agent, or Firm* — Stanzione & Kim, LLP (57) ABSTRACT

A facsimile apparatus capable of transmitting and receiving voice data and non-voice data, and supporting a plurality of lines includes a main section including a plurality of modem units to individually control each of the plurality of modem units, and a line section including a plurality of line connecting units to connect a plurality of General Switched Telephone Networks (GSTNs) with the plurality of modem units, respectively. Accordingly, a plurality of lines can be used via one telephone circuit.

22 Claims, 7 Drawing Sheets

FACSIMILE APPARATUS TO SUPPORT A PLURALITY OF LINES AND OPERATING METHOD THEREOF

CROSS-REFERENCE TO RELATED APPLICATIONS

This application claims priority under 35 U.S.C. §119(a) from Korean Patent Application No. 2006-101386, filed Oct. 18, 2006, the contents of which are incorporated herein by reference in its entirety.

BACKGROUND OF THE INVENTION

1. Field of the Invention

The present general inventive concept relates to a facsimile apparatus to support a plurality of lines and an operating method thereof, and more specifically, to a facsimile apparatus to support a plurality of lines by using a plurality of modems to selectively connect one of the lines and an operating method thereof.

2. Description of the Related Art

In general, a facsimile apparatus includes a scanner to optically read a document, a printer to print incoming data and data read out with the scanner, and a communication unit to transmit and receive data to and from another facsimile machine over a telephone line connected to the General Switched Telephone Network (GSTN), each being integrally formed in one device for the simple exchange of documents.

Such a facsimile machine has a telephone function to receive or make a normal voice telephone call, so that voice data and non-voice data (i.e., fax data) can be transmitted/received to and from another facsimile machine hooked up to a phone line.

Accordingly, the facsimile machine is capable of transmitting and receiving voice and non-voice data. However, it can only transmit and receive one of the voice and non-voice data. That is, if it is currently being used to transmit or receive voice data, it cannot transmit or receive non-voice data at the same time.

For instance, if a user is sending or receiving a document through a facsimile machine, because the GSTN is already being engaged in a facsimile transmission, the user cannot receive or make a voice telephone call through the same facsimile machine. Likewise, if the user is receiving or making a telephone call through the facsimile device, because the GSTN is already being engaged, the user cannot transmit or receive a document through the same facsimile machine.

Accordingly, a conventional facsimile machine can selectively transmit or receive only one of voice and non-voice data at a time. Therefore, the efficiency of the facsimile machine capable of transmitting/receiving both voice and non-voice data is not fully appreciated.

SUMMARY OF THE INVENTION

The present general inventive concept provides a facsimile apparatus to support a plurality of lines, which has a plurality of modems in one telephone circuit to selectively use a plurality of public telecommunication network lines via the single telephone circuit, and an operating method thereof.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a facsimile apparatus capable of transmitting and receiving voice data and fax data, including a main section including a plurality of modem units to individually control each of the plurality of modem units, and a line section including a plurality of line connecting units to connect a plurality of General Switched Telephone Networks (GSTNs) with the plurality of modem units, respectively.

A plurality of data transmitting units may be further provided, to connect the plurality of modem units to the plurality of line connecting units, respectively, and transmit the voice data and the fax data.

The main section may further include a voice processing unit to process the voice data, and a control unit to determine an availability of each of the plurality of modem units, in response to a modem availability request signal.

Each of the plurality of modem units may include a voice interface unit to support an interaction between the control unit and the voice processing unit, and the control unit to control an on/off state of the voice interface unit of a respective modem unit and to operate at least one of a plurality of the modem units.

The main section may include a voice processing unit to process the voice data, a switching unit to connect the voice processing unit with the plurality of modem units, and switch connections between the voice processing unit and the plurality of modem units, and a control unit to determine an availability of each of the plurality of modem units in response to a modem availability request signal, and to operate another modem unit if one of the plurality of modem units is connected to the voice processing unit.

The control unit may operate another modem unit, if one of the plurality of modem units is in operation, operate one of the plurality of modem units according to a predetermined priority, if all of the modem units are available, and perform an error processing, if all of the plurality of modem units are in operation.

The foregoing and/or other aspects and utilities of the present general inventive concept may also be achieved by providing an operating method of a facsimile apparatus capable of transmitting and receiving voice data and fax data, and including a plurality of modem units connected to a plurality of General Switched Telephone Networks (GSTNs), respectively, the method including determining availability of each of the plurality of modem units in response to a modem availability request signal, and connecting to one of the plurality of GSTNs through at least one available modem unit, if the result of determination indicates that the at least one modem unit is available.

The connecting to one of the GSTNs may include connecting to the one of the plurality of GSTNs via one of the plurality of modem units according to a predetermined priority, if the result of the determination indicates that two or more of the plurality of model units are available.

Carrying out an error processing may be further provided, if the result of the determination indicates that all of the plurality of modem units are unavailable.

The foregoing and/or other aspects and utilities of the present general inventive concept may also be achieved by providing a facsimile apparatus usable with a plurality of telephone networks, the apparatus including a plurality of modem units capable of transmitting and receiving voice data and non-voice data, and a control unit to individually control each of the plurality of modem units and to establish a connection between at least one of the plurality of modem units and at least one of the plurality of the telephone networks.

The foregoing and/or other aspects and utilities of the present general inventive concept may also be achieved by providing a method of operating a facsimile apparatus having a plurality of modem units, the method including determining whether at least one modem unit of the plurality of modem units of the facsimile apparatus is available in response to a modem availability request, and performing at least one of connecting an available modem unit to one of a plurality of telephone networks and providing a non-available modem notification based on a result of the determining operation.

The foregoing and/or other aspects and utilities of the present general inventive concept may also be achieved by providing a facsimile apparatus usable with a plurality of telephone networks, the apparatus including a modem unit capable of transmitting and receiving voice data and non-voice data, a plurality of line connecting units capable of connecting the modem unit to the plurality of telephone networks, and a control unit to control at least one of the modem unit and the plurality of line connecting units to establish a communication path between the modem unit and the plurality of telephone networks.

The foregoing and/or other aspects and utilities of the present general inventive concept may also be achieved by providing A facsimile apparatus usable with a plurality of telephone networks, the apparatus including a voice processing unit to process the voice data, a switching unit coupled to the voice processing unit, a modem unit capable of transmitting and receiving voice data and non-voice data, a plurality of line connecting units capable of connecting the modem unit to the plurality of telephone networks, and a control unit to control at least one of the modem unit, the plurality of line connecting units and the switching unit to establish a communication path between the modem unit and the plurality of telephone networks.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
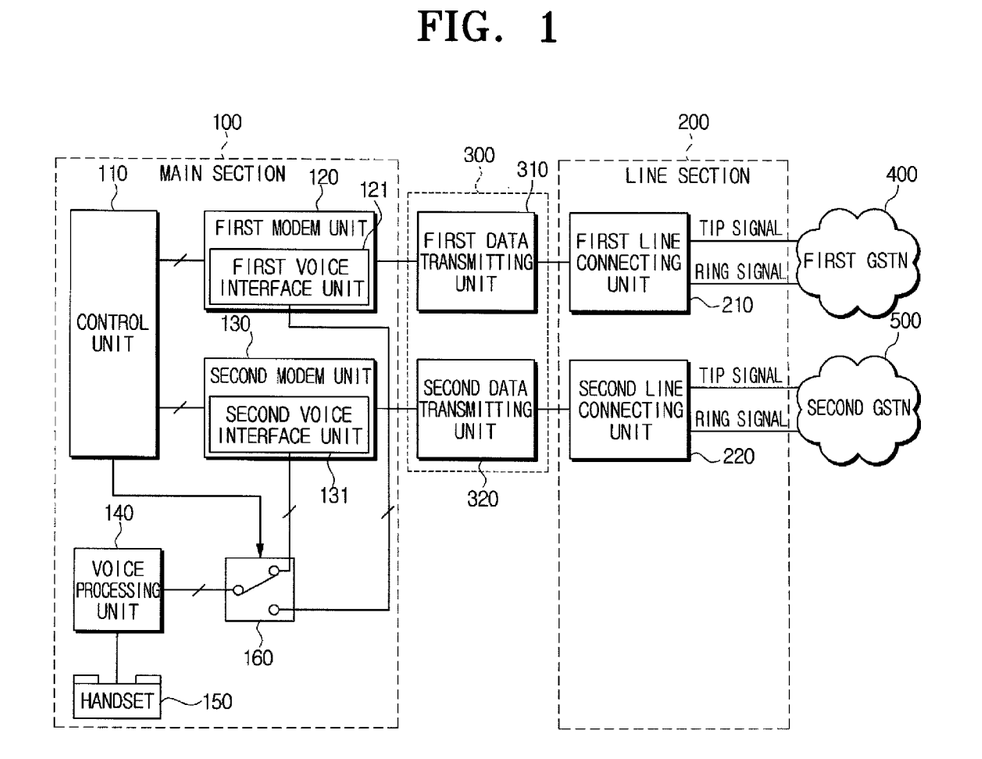
FIG. 1 is a block diagram illustrating a digital facsimile apparatus to support a plurality of lines according to an embodiment of the present general inventive concept.

FIG. 1 is a block diagram illustrating a digital facsimile apparatus to support a plurality of lines according to an embodiment of the present general inventive concept.

Facsimile apparatus may include, but not be limited to, a facsimile machine, a facsimile circuit board, and a facsimile card or code, for example, that can work in conjunction with a computer. The facsimile apparatus may have an image forming unit to form or print an image according to a signal or a scanned document, and an interface unit to communicate with an external device to transmit and receive the signal through a phone line, a network, or a wireless line.

Referring to FIG. 1, a facsimile apparatus according to an embodiment of the present general inventive concept includes a main section 100, a line section 200, and a data transmitting unit 300. The facsimile apparatus of FIG. 1 illustrates a structure of a digital facsimile apparatus.

As illustrated in FIG. 1, the main section 100 includes a control unit 110, a first modem unit 120, a second modem unit 130, a voice processing unit 140, a handset 150, and a switching unit 160. In an embodiment of the present general inventive concept the main section 100 has two modem units, but those of skilled in the art will appreciate based on the description herein, that the number of modem units is not limited as is illustrated in the drawing and the main section 100 may have more than two modem units, if necessary.

Referring to FIG. 1, the control unit 110 controls an overall operation of the main section 100. That is, the control unit 110 controls signal input/output among the first modem unit 120, the second modem unit 130, the voice processing unit 140, the handset 150, and the switching unit 160.

If a modem availability request signal is input, the control unit 110 determines availability of a plurality of modem units including the first and second modem units 120 and 130. For instance, the control unit 110 determines that a modem unit currently being in operation is unavailable, and determines that a modem unit currently not in operation is available.

The modem availability request signal may include an off-hook indication signal which indicates that, for example, the user uses the handset 150 to communicate with an external device through one of the first modem unit 120 and the second modem unit 130 or has already engaged the general switched telephone network (GSTN), and a signal indicative of data transmission from a first and a second General Switched Telephone Networks (GSTNs) 400 and 500.

When the modem availability request signal is received by the control unit 110, the control unit 110 determines whether the switching unit 160 is connected to one of the first and second modem units 120 and 130, and operates the modem unit which is not connected to the switching unit 160.

Referring to FIG. 1, the first modem unit 120 is connected to a first line connecting unit 210 via a first data transmitting unit 310, to transmit and receive data. In addition, the first modem unit 120 includes a first voice interface unit 121 that is connected to the switching unit 160 to interact with the voice processing unit 140.

The second modem unit 130 is connected to a second line connecting unit 220 via a second data transmitting unit 320, to transmit and receive data. In addition, the second modem unit 130 includes a second voice interface unit 131 that is connected to the switching unit 160 to interact with the voice processing unit 140.

The voice processing unit 140 carries out general operations for a normal telephone voice call. In an embodiment of the present general inventive concept, when voice data is input to the voice processing unit 140 from one of the first and second modem units 120 and 130, the voice processing unit 140 converts digital voice data to analog voice data and outputs it to the handset 150. Also, when analog voice data is transmitted from the handset 150 to the voice processing unit 140, the voice processing unit 140 converts it to digital voice data and transmits it to one of the first and second modem units 120 and 130 connected to the switching unit 160.

The handset 150 receives the user's analog voice and transmits it to the voice processing unit 140, or receives analog voice data from the voice processing unit 140 and transmits it to the user. A conventional handset 150 and a conventional voice processing unit 140 may be used as the handset 150 and the voice processing unit 140, respectively.

Referring to FIG. 1, the switching unit 160 connects the voice processing unit 140 with the first and second modem units 120 and 130, to switch the connections between the voice processing unit 140 and the first and second modem units 120 and 130, respectively. The switching unit 160, under the control of the control unit 110, switches connections between the voice processing unit 140 and the first and second modem units 120 and 130, respectively.

As illustrated in FIG. 1, the line section 200 includes the first line connecting unit 210 and the second line connecting unit 220. Because the line section 200 may have, for example, the same number of line connecting units as the number of modems included in the main section 100, this embodiment includes two line connecting units used for illustrative purposes.

In an embodiment of the present general inventive concept, the first line connecting unit 210 is connected to the first GSTN 400 to transmit and receive data to and from the first GSTN 400. That is, the first line connecting unit 210 transmits data from the first GSTN 400 to the first modem unit 120 via the first data transmitting unit 310, and transmits the data, which has been received from the first modem unit 120 through the first data transmitting unit 310, to a receiving side via the first GSTN 400.

In an embodiment of the present general inventive concept, the second line connecting unit 220 is connected to the second GSTN 500 to transmit and receive data to and from the second GSTN 500. That is, the second line connecting unit 220 transmits data from the second GSTN 500 to the second modem unit 130 via the second data transmitting unit 320, and transmits the data, which has been received from the second modem unit 130 through the second data transmitting unit 320, to a receiving side via the second GSTN 500.

Data input from the first and second GSTNs 400 and 500 to the first and second line connecting units 210 and 220 include a TIP signal and a RING signal. The TIP signal and the RING signal may be received through a tip line and a ring line, respectively, which are, for example, two stranded wires of a telephone line used in GSTN communication.

As illustrated in FIG. 1, the data transmitting unit 300 includes the first data transmitting unit 310 and the second data transmitting unit 320. Because the data transmitting unit 300 may have, for example, the same number of the data transmitting units as the number of modem units in the main section 100 and the line connecting units in the line section 200, in this embodiment, two data transmitting units 310 and 320 are included. Those skilled in the art will appreciate based on the description herein, that the number of data transmitting units 310 and 320 is not limited as is illustrated in the drawing and the main section 100 may have more than two data transmitting units 310 and 320, if necessary.

The first data transmitting unit 310 connects the first line connecting unit 210 and the first modem unit 120, to send data from the first line connecting unit 210 to the first modem unit 120 and send data from the first modem unit 120 to the first line connecting unit 210.

The second data transmitting unit 320 connects the second line connecting unit 220 and the second modem unit 130, to send data from the second line connecting unit 220 to the second modem unit 130 and sends data from the second modem unit 130 to the second line connecting unit 220.

Figure 2:
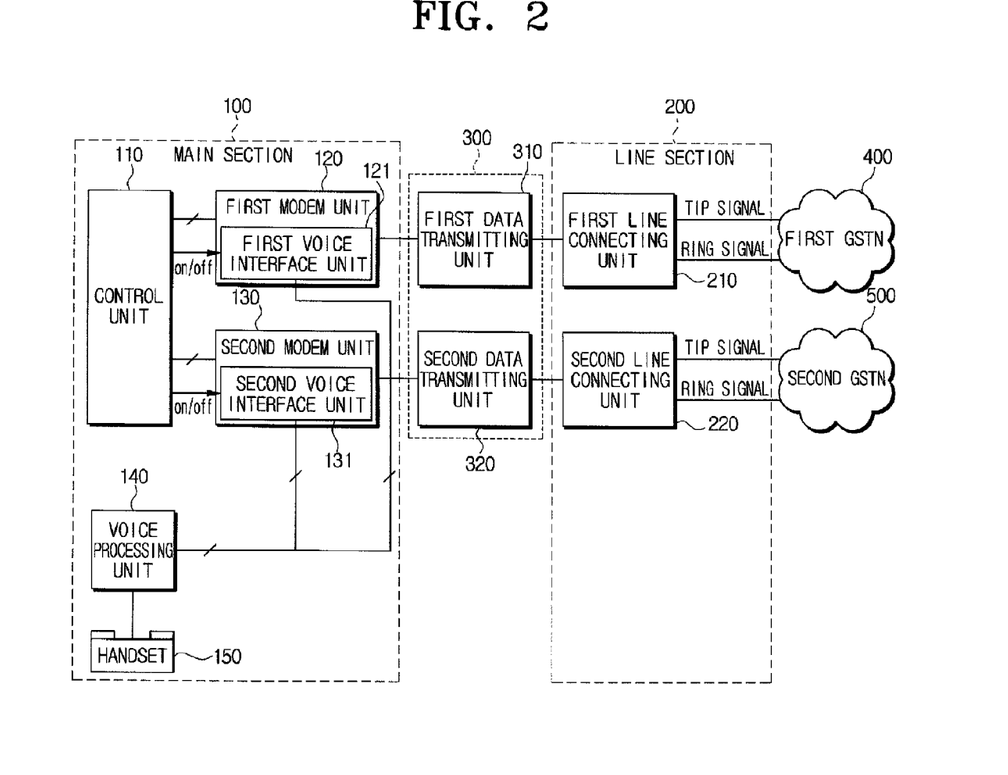
FIG. 2 is a block diagram illustrating a digital facsimile apparatus to support a plurality of lines according to an embodiment of the present general inventive concept.

FIG. 2 is a block diagram illustrating a digital facsimile apparatus to support a plurality of lines according to an embodiment of the present general inventive concept.

A facsimile apparatus of FIG. 2 illustrates a similar structure of a digital facsimile apparatus according to FIG. 1. Therefore, the explanation of the same components will be omitted hereafter, and only different components will be explained. In addition, it will be noted that like components are designated by the same reference numerals.

In the facsimile apparatus illustrated in FIG. 1, the voice processing unit 140 is connected to the first and the second modem units 120 and 130 via the switching unit 160. Accordingly, a connection state between the voice processing unit 140 and the first and second modem units 120 and 130 can be determined by operation of the switching unit 160.

In the facsimile apparatus illustrated in FIG. 2, however, there is no such switching unit 160, as illustrated in FIG. 1, to connect the voice processing unit 140 with the first and the second modem units 120 and 130. Accordingly, the connection state between the voice processing unit 140 and the first and second modem units 120 and 130 can be determined by a control unit 110.

Referring to FIG. 2, the control unit 110 is capable of controlling an on/off state of a first and a second voice interface unit 121 and 131 of the first and the second modem units 120 and 130, respectively. Thus, the control unit 110 can operate one of the first and second modem units 120 and 130.

As described above, the facsimile apparatus, illustrated in FIG. 1, and the facsimile apparatus, illustrated in FIG. 2, have similar functions of line section 200, data transmitting unit 300, first and second modem units 120 and 130, voice processing unit 140, and handset 150, except for the presence and absence of the switching unit 160 and the function of the control unit 110.

Figure 3:
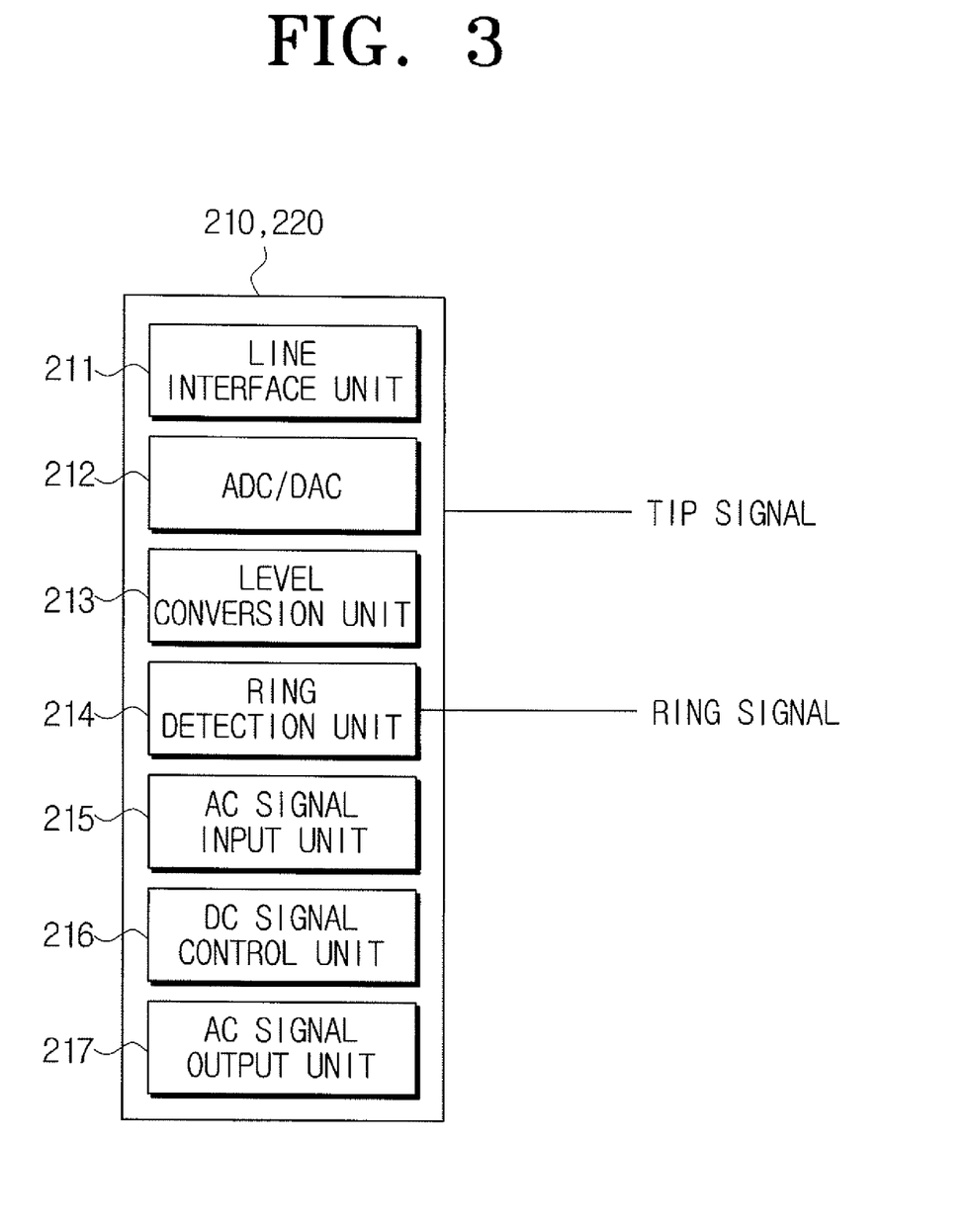
FIG. 3 is a block diagram illustrating a line connecting unit of FIG. 1 and FIG. 2 according to an embodiment of the present general inventive concept.

FIG. 3 is a block diagram illustrating a line connecting unit according to FIG. 1 and FIG. 2.

In an embodiment of the present general inventive concept, FIG. 3 depicts an internal structure of the first and the second line connecting units 210 and 220 of the line section 200 of the digital facsimile apparatus according to FIG. 1 and FIG. 2, respectively. Referring to FIG. 3, the first and the second line connecting units 210 and 220 include a line interface unit 211, an ADC/DAC 212, a level conversion unit 213, a ring detection unit 214, an AC signal input unit 215, a DC signal control unit 216, and an AC signal output unit 217.

Referring to FIGS. 1, 2, and 3, the line interface unit 211 interfaces between one of the first and second data transmitting units 310 and 320 and one of the first and second GSTNs 400 and 500, such that voice and fax data are transmitted and received therebetween.

The ADC/DAC 212 converts analog data input via the first and the second GSTNs 400 and 500 to digital data, and converts digital data input from the first and the second modem units 120 and 130 to analog data.

The level conversion unit 213 converts a level of a signal input via one of the first and second GSTNs 400 and 500, or a level of a signal input from the first and second modem units 120 and 130, and outputs the level changed signal.

The ring detection unit 214 detects an input of a RING signal among the input signals from one of the first and second GSTNs 400 and 500. After the ring detection unit 214 detects the input of the RING signal and sends it to one of the first and second modem units 120 and 130, the control unit 110 can find out from which of the first and second GSTNs 400 and 500 has the RING signal been received.

The AC signal input unit 215 inputs or transmits an AC signal to the facsimile apparatus when data has been transmitted via one of the first and second GSTNs 400 and 500. In addition, a DC signal control unit 216 controls such that a DC is continuously being applied while the facsimile apparatus is in operation.

The AC signal output unit 217 outputs an AC signal to the first GSTN 400 and/or the second GSTN 500 while input data from one of the first and second modem units 120 and 130 is being transmitted to one of the first and second GSTNs 400 and 500.

When data is input to the first and the second line connecting units 210 and 220 via one of the first and second GSTNs 400 and 500, the data sequentially goes through, for example, the AC signal input unit 215, the level conversion unit 213, the ADC/DAC 212, and the line interface unit 211.

Alternatively, when data is input to the first and the second line connecting units 210 and 220 to transmit via the first and the second GSTNs 400 and 500, the data sequentially goes through, for example, the line interface unit 211, the ADC/DAC 212, the level conversion unit 213, and the AC signal output unit 217.

Figure 4:
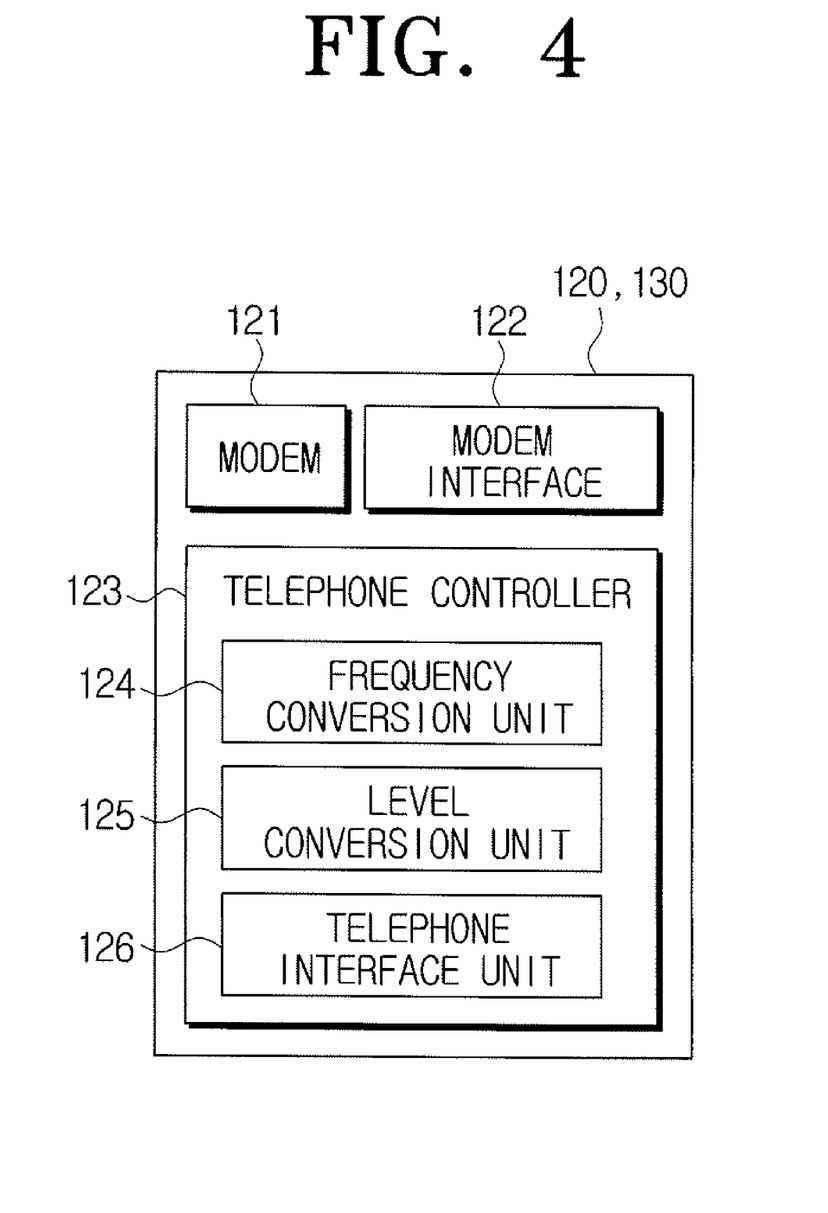
FIG. 4 is a block diagram illustrating a modem unit of FIG. 1 and FIG. 2 according to an embodiment of the present general inventive concept.

FIG. 4 is a block diagram illustrating a modem unit according to FIG. 1 and FIG. 2.

In an embodiment of the present general inventive concept, FIG. 4 illustrates structure of the first and the second modem units 120 and 130 installed in the digital facsimile apparatus according to FIG. 1 and FIG. 2. Referring to FIG. 4, the first and the second modem units 120 and 130 include a modem 121, a modem interface 122, and a telephone controller 123.

The modem 121 is involved with the actual communication with the first and the seconds GSTN 400 and 500, and the modem interface 122 interfaces between the modem 121 and one of the first and second data transmitting units 310 and 320.

The telephone controller 123 includes a frequency conversion unit 124, a level conversion unit 125, and a telephone interface unit 126. An input signal to the telephone controller 123 undergoes a frequency conversion in the frequency conversion unit 124 and a level conversion in the level conversion unit 125. Then, the signal is transmitted to the handset 150 through the telephone interface unit 126.

Figure 5:
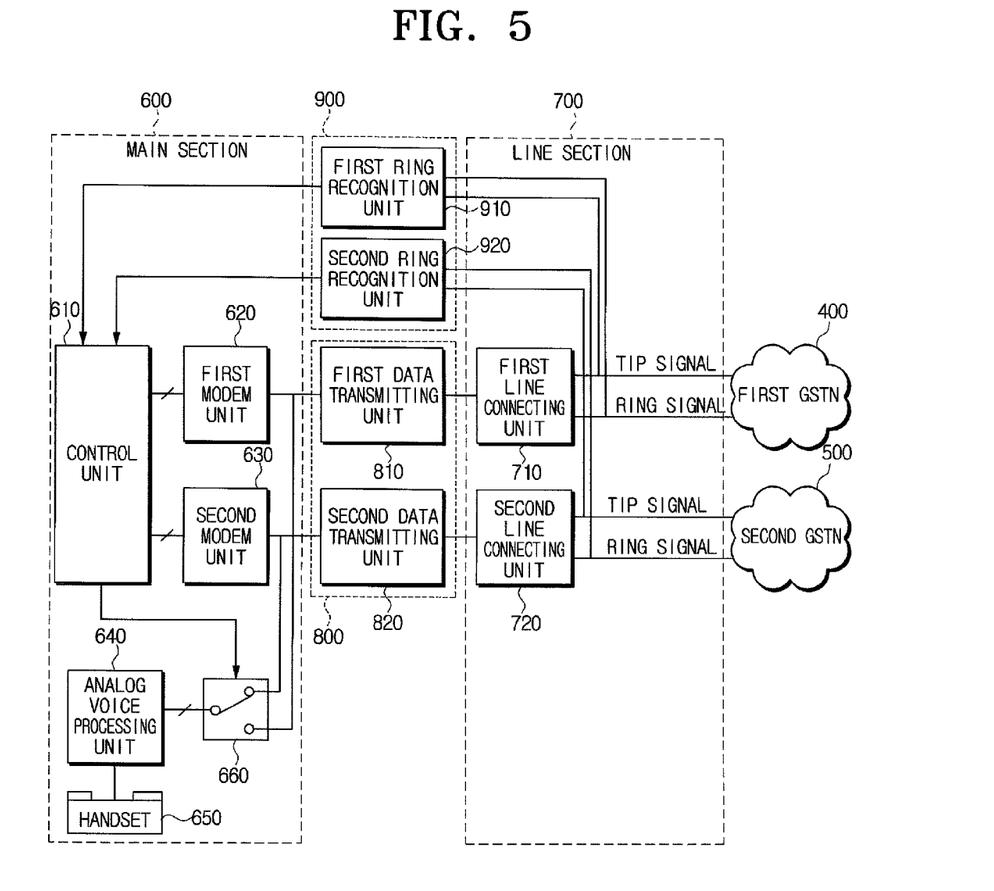
FIG. 5 is a block diagram illustrating an analog facsimile apparatus to support a plurality of lines according to an embodiment of the present general inventive concept.
Figure 6:
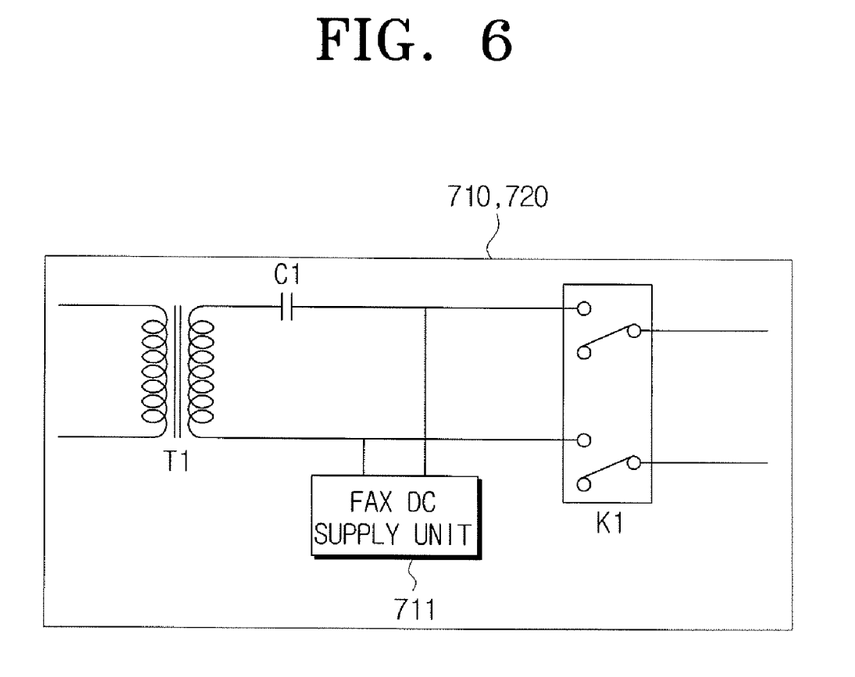
FIG. 6 is a block diagram illustrating a line connecting unit of FIG. 5 according to an embodiment of the present general inventive concept.

FIG. 5 is a block diagram illustrating an analog facsimile apparatus to support a plurality of lines, according to an embodiment of the present general inventive concept, and FIG. 6 is a block diagram of a line connecting unit according to FIG. 5.

Whereas a digital facsimile apparatus is illustrated in FIG. 1 and FIG. 2, FIG. 5 illustrates an analog facsimile apparatus. Accordingly, both an analog and digital facsimile apparatus to support a plurality of lines are included in the present general inventive concept.

As illustrated in FIG. 5, a facsimile apparatus according to an embodiment of the present general inventive concept includes a main section 600, a line section 700, a data transmitting unit 800, and a ring recognition unit 900.

The main section 600 includes a control unit 610, a plurality of modem units including a first and a second modem unit 620 and 630, an analog voice processing unit 640, a handset 650, and a switching unit 660. Since the main section 600 carries out similar operations as the main section 100 according to FIG. 1, it will not be explained in further detail.

Referring to FIG. 5, the line section 700 may have, for example, the same number of line connecting units as the number of modem units, so the line section 700 may include a first line connecting unit 710 and a second line connecting unit 720. In an embodiment of the present general inventive concept, first and the second line connecting units 710 and 720, in an analog facsimile apparatus, are not required to perform analog/digital conversion and ring signal detection, so that they have a relatively simple structure compared with the first and the second digital line connecting units 210 and 220 illustrated in FIG. 4.

FIG. 6 is a block diagram illustrating a line connecting unit of FIG. 5 according to an embodiment of the present general inventive concept. Referring to FIGS. 5 and 6, the first and the second line connecting units 710 and 720 may include a transformer T1, a capacitor C1, a fax DC supply unit 711, and two switches K1. A TIP signal and a RING signal received via one of the first and second GSTNs 400 and 500 go through the switches K1, the capacitor C1, and the transformer T1, and are eventually transmitted to the main section 600 through the first and the second data transmitting units 810 and 820.

Referring to FIGS. 5 and 6, when input data from one of the first and second modem units 620 and 630 pass through the first and the second data transmitting units 810 and 820 and are transmitted to the first and the second GSTNs 400 and 500, one of the two switches K1 is selectively operated, to choose one of the first and second GSTNs 400 and 500.

Referring to FIG. 5, the data transmitting unit 800 may include the first and the second data transmitting units 810 and 820 to connect the first and the second modem units 620 and 630 included in the main section 600 to the first and the second line connecting units 710, 720 included in the line section 700, respectively.

Referring to FIG. 5, the ring recognition unit 900 recognizes input RING signals from the first and the second GSTNs 400 and 500. The ring recognition unit 900 includes a first and a second ring recognition unit 910 and 920 that are connected to the first and the second GSTNs 400 and 500, respectively.

The facsimile apparatus to support a plurality of lines according to several embodiments of the present general inventive concept may be incorporated with both analog and digital operating systems, and one of the lines can be selected under the control of the control unit 110 and 610 of the main section 100 and 600, as illustrated in FIG. 2, or according to the operation of the switching unit 160 and 660, as illustrated in FIGS. 1 and 5.

Figure 7:
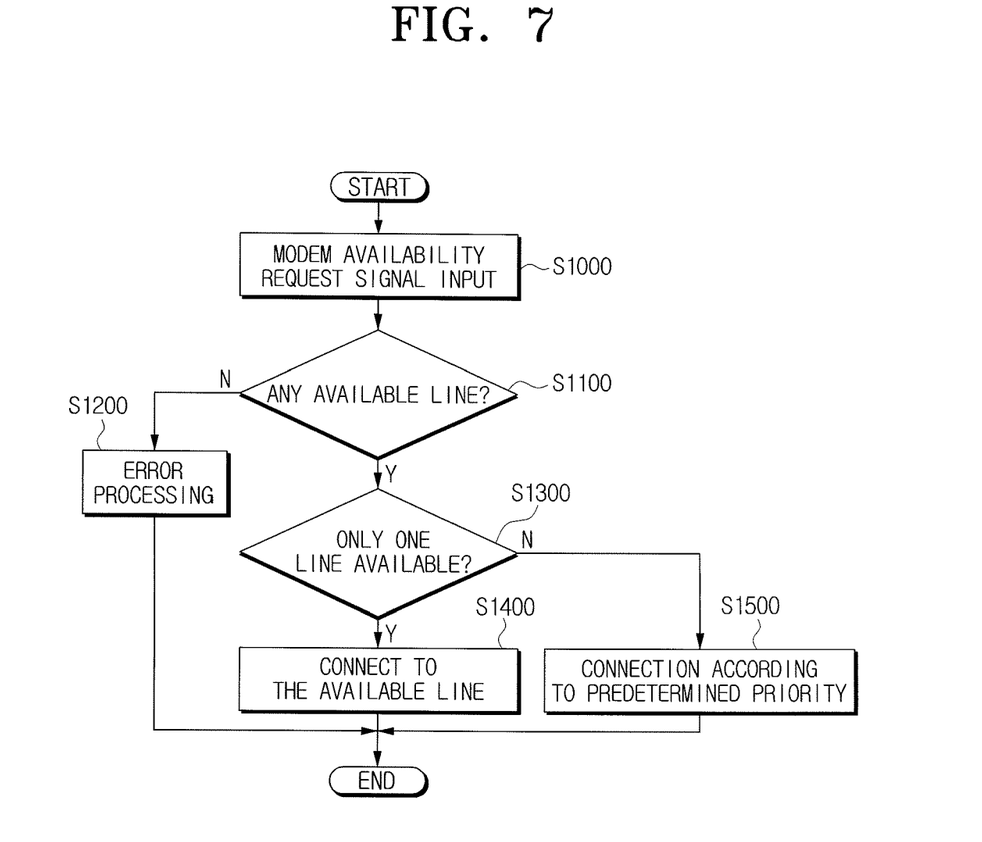
FIG. 7 is a flow chart illustrating an operating method of a facsimile apparatus according to an embodiment of the present general inventive concept.

FIG. 7 is a flow chart illustrating an operating method of a facsimile apparatus according to an embodiment of the present general inventive concept.

For illustrative purposes, the operation method to be explained hereafter is applied to, for example, the digital facsimile apparatus according to FIG. 1.

Referring to FIGS. 1 and 7, in operation S1000, it is determined whether a modem availability request signal is received. If so, in operation S1100, the control unit 110 determines whether there is an available line, for example, corresponding to a modem unit. That is, the control unit 110 determines whether there is a non-operating modem unit among the plurality of modem units.

In operation S1100, if the control unit 110 determines that all the lines, for example, corresponding to modem units are busy and there is no available line, in operation S1200, the control unit 110 performs error processing to notify a user that the facsimile apparatus cannot be used at the moment.

If the control unit 110 determines that there is an available line in operation S1100, in operation S1300, the control unit 110 checks the number of available lines among the plurality of lines and determines whether only one line is available.

In operation S1300, if only one line is available, under the control of the control unit 110, in operation S1400, the switching unit 160 is connected to one of the first and second modem units 120 and 130 corresponding to the single available line.

If, however, in operation S1300, upon determination that more than two lines are available, in operation S1500, the control unit 110 determines which lines to use in accordance with a predetermined priority, and controls the switching unit 160 to be connected to one of the first and second modem units 120 and 130 corresponding to the determined line. As a result, the plurality of modem units of the main section 100 can be used very efficiently.

Accordingly a facsimile apparatus that supports a plurality of lines and its operating method, and includes a plurality of modems within one telephone circuit, makes it possible to selectively use a plurality of public telecommunication network lines by a telephone circuit, so that users are allowed to use voice and fax data transmission at the same time. In an embodiment of the present general inventive concept, a single modem unit may function to correspond to more than one line.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A facsimile apparatus capable of transmitting and receiving voice data and fax data, comprising:
a main section including a plurality of modem units, and including a control unit to individually control each of the plurality of modem units;
a line section including a plurality of line connecting units to connect a plurality of General Switched Telephone Networks (GSTNs) with the plurality of modem units, respectively; and
a voice processing unit in electrical communication with the plurality of modem units to selectively communicate voice data based on the control of the plurality of modem units.

2. The facsimile apparatus of claim 1, further comprising:
a plurality of data transmitting units to connect the plurality of modem units to the plurality of line connecting units, respectively, and transmit the voice data and the fax data.

3. The facsimile apparatus of claim 1, wherein the main section further comprises:
a control unit to determine an availability of each of the plurality of modem units, in response to a modem availability request signal.

4. The facsimile apparatus of claim 3, wherein each of the plurality of modem units comprises a voice interface unit to support an interaction between the control unit and the voice processing unit, and wherein the control unit to control an on/off state of the voice interface unit of a respective modem unit and to operate at least one of a plurality of the modem units.

5. The facsimile apparatus of claim 1, wherein the main section comprises:
a voice processing unit to process the voice data;
a switching unit to connect the voice processing unit with the plurality of modem units, and switch connections between the voice processing unit and the plurality of modem units; and
a control unit to determine an availability of each of the plurality of modem units in response to a modem availability request signal, and to operate another modem unit if one of the plurality of modem units is connected to the voice processing unit.

6. The facsimile apparatus of claim 3, wherein the control unit
operates another modem unit, if one of the plurality of modem units is in operation;
operates one of the plurality of modem units according to a predetermined priority, if all of the modem units are available; and
performs an error processing, if all of the plurality of modem units are in operation.

7. The facsimile apparatus of claim 5, wherein the control unit operates another modem unit, if one of the plurality of modem units is in operation;
operates one of the modem units according to a predetermined priority, if all of the modem units are available; and
performs an error processing, if all of the plurality of modem units are in operation.

8. An operating method of a facsimile apparatus capable of transmitting and receiving voice data and fax data, and comprising a plurality of modem units connected to a plurality of General Switched Telephone Networks (GSTNs), respectively, the method comprising:
determining availability of each modem unit among the plurality of modem units in response to a modem availability request signal;
connecting to one of the plurality of GSTNs through at least one available modem unit, if a result of the determination indicates that the at least one modem unit is available; and
selectively communicating a voice processing unit in electrical communication with the plurality of modem units to process the voice data based on the availability of the plurality of modem units.

9. The method of claim 8, wherein the connecting to one of the GSTNs comprises connecting to the one of the plurality of GSTNs via one of the plurality of modem units according to a predetermined priority, if the result of the determination indicates that two or more of the plurality of modem units are available.

10. The method of claim 8, further comprising:
carrying out an error processing, if the result of the determination indicates that all of the plurality modem units are unavailable.

11. A facsimile apparatus usable with a plurality of telephone networks, the apparatus comprising:
a plurality of modem units capable of transmitting and receiving voice data and non-voice data;
a control unit to individually control each of the plurality of modem units and to establish a connection between at least one of the plurality of modem units and at least one of the plurality of the telephone networks; and
a voice processing unit in electrical communication with the plurality of modem units to selectively communicate voice data based on the control of the plurality of modem units.

12. The facsimile apparatus of claim 11, further comprising:

a plurality of line connecting units capable of connecting the plurality of modem units with the plurality of telephone networks, respectively.

13. The facsimile apparatus of claim 11, wherein the plurality of telephone networks comprise general switched telephone networks.

14. The facsimile apparatus of 11, further comprising:
a first connection between a first modem unit and a first telephone network to transmit non-voice data; and
a second connection between a second modem unit and a second telephone network to transmit voice data at a same time that the fax data is transmitted.

15. A method of operating a facsimile apparatus having a plurality of modem units, the method comprising:
determining whether at least one modem unit of the plurality of modem units of the facsimile apparatus is available in response to a modem availability request;
performing at least one of connecting an available modem unit to one of a plurality of telephone networks and providing a non-available modem notification based on a result of the determining operation; and
selectively communicating voice data between a voice processing unit in electrical communication with the plurality of modem units based on the availability of the plurality of modem units.

16. The method according to claim 15, further comprising connecting an available modem unit to one of the plurality of telephone networks based on a predetermined priority in response to the result of the determining operation being that more than one modem unit are available.

17. The method according to claim 15, wherein connecting the available modem unit to one of the plurality of telephone networks is based on the result of the determining operation that only one of the plurality of modem units is available.

18. The method according to claim 15, wherein providing the non-available modem notification is based on the result of the determining operation that no modem units are available.

19. The method according to claim 15, wherein the plurality of telephone networks are general switched telephone networks.

20. A facsimile apparatus usable with a plurality of telephone networks, the apparatus comprising:
a plurality of modem units capable of transmitting and receiving voice data and non-voice data;
a plurality of line connecting units capable of connecting a modem unit among the plurality of modem units to the plurality of telephone networks;
a control unit to control the plurality of modem units and the plurality of line connecting units to establish a communication path between the modem unit and the plurality of telephone networks; and
a voice processing unit in electrical communication with the plurality of modem units to selectively communicate voice data based on the control of the plurality of modem units.

21. The facsimile apparatus according to claim 20, wherein the modem unit further comprises:
a first modem connectable to a first line connecting unit; and
a second modem connectable to a second line connecting unit.

22. A facsimile apparatus usable with a plurality of telephone networks, the apparatus comprising:
a voice processing unit to process voice data;
a switching unit coupled to the voice processing unit;
a plurality of modem units coupled to the switching unit and capable of transmitting and receiving voice data and non-voice data;
a plurality of line connecting units capable of connecting the modem unit to the plurality of telephone networks; and
a control unit to control at least one modem unit among the plurality of modem units, the plurality of line connecting units, and the switching unit to establish a communication path between the plurality of modem units and the plurality of telephone networks, and to selectively connect the voice processing unit to the plurality of modem units via the switching unit based on an operating state of the modem unit.

* * * * *